United States Patent [19]
Barton et al.

[11] 3,924,983
[45] Dec. 9, 1975

[54] GREEN TIRE LOADER

[75] Inventors: Dale S. Barton, Columbiana; Stephen P. Yendrich, Jr., Beloit, both of Ohio

[73] Assignee: NRM Corporation, Akron, Ohio

[22] Filed: Nov. 14, 1974

[21] Appl. No.: 523,563

[52] U.S. Cl. .................................................. 425/38
[51] Int. Cl.² ........................................... B29H 5/02
[58] Field of Search .............. 425/32, 33, 34, 36, 38

[56] References Cited
UNITED STATES PATENTS

| | | | |
|---|---|---|---|
| 2,997,738 | 8/1961 | Soderquist | 425/38 X |
| 3,065,503 | 11/1962 | Mallory et al. | 425/38 |
| 3,091,801 | 6/1963 | Erickson | 425/32 |
| 3,167,810 | 2/1965 | Soderquist | 425/32 |
| 3,229,329 | 1/1966 | Heston et al. | 425/33 |
| 3,267,515 | 8/1966 | Ulm | 425/33 X |
| 3,380,115 | 4/1968 | Soderquist | 425/38 |
| 3,550,196 | 12/1970 | Gaguit | 425/34 |
| 3,564,649 | 2/1971 | Soderquist | 425/36 X |
| 3,584,335 | 6/1971 | Ulm et al. | 425/36 |
| 3,640,653 | 2/1972 | Laenen et al. | 425/38 X |

Primary Examiner—J. Howard Flint, Jr.
Attorney, Agent, or Firm—Donnelly, Maky, Renner & Otto

[57] ABSTRACT

A green tire loader for a vulcanizing press is disclosed that includes at least one green tire chuck assembly vertically reciprocally movable when in coaxial alignment with either the tire pickup position or the lower mold half of the press and horizontally reciprocally movable between such positions of alignment when elevated. Such horizontal reciprocal movement of the chuck assembly is obtained by a carriage which is telescopically extended fore and aft relative to a floating carriage that is horizontally driven by a cable cylinder relative to a horizontally fixed but vertically movable frame which travels between two fixed tracks. Each chuck assembly is independently vertically adjustable relative to the supporting carriage to permit tires of various heights to be loaded with the same loading device.

29 Claims, 9 Drawing Figures

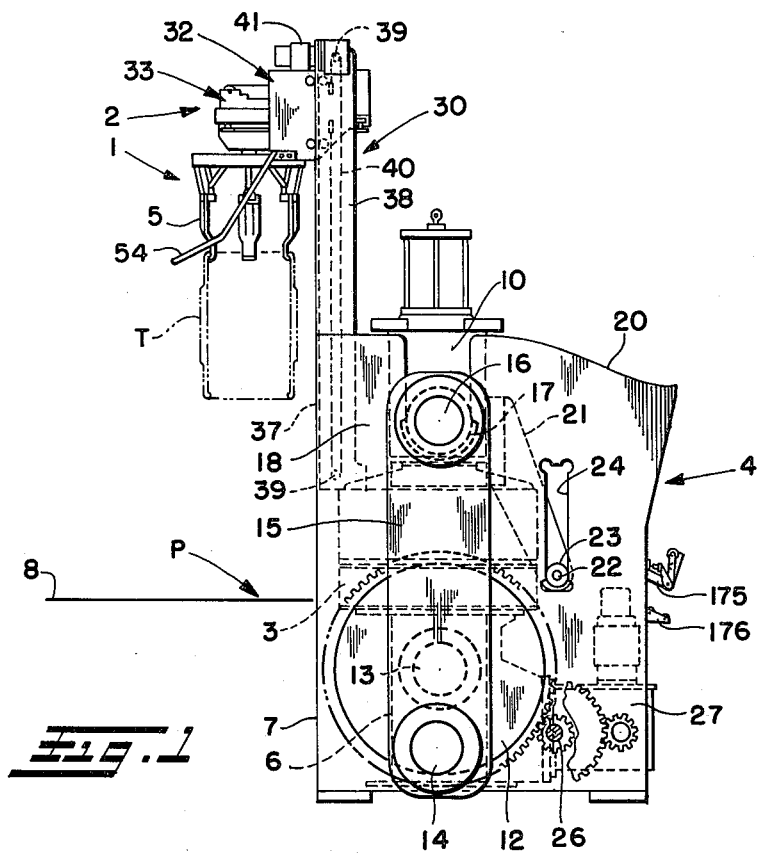
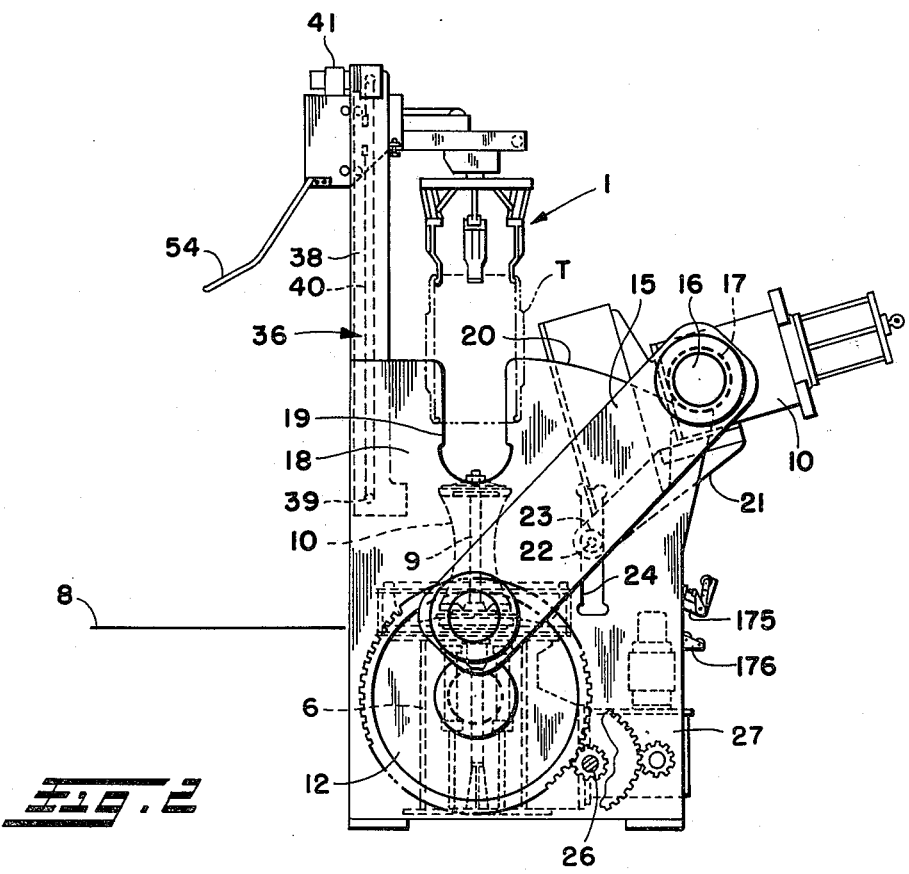

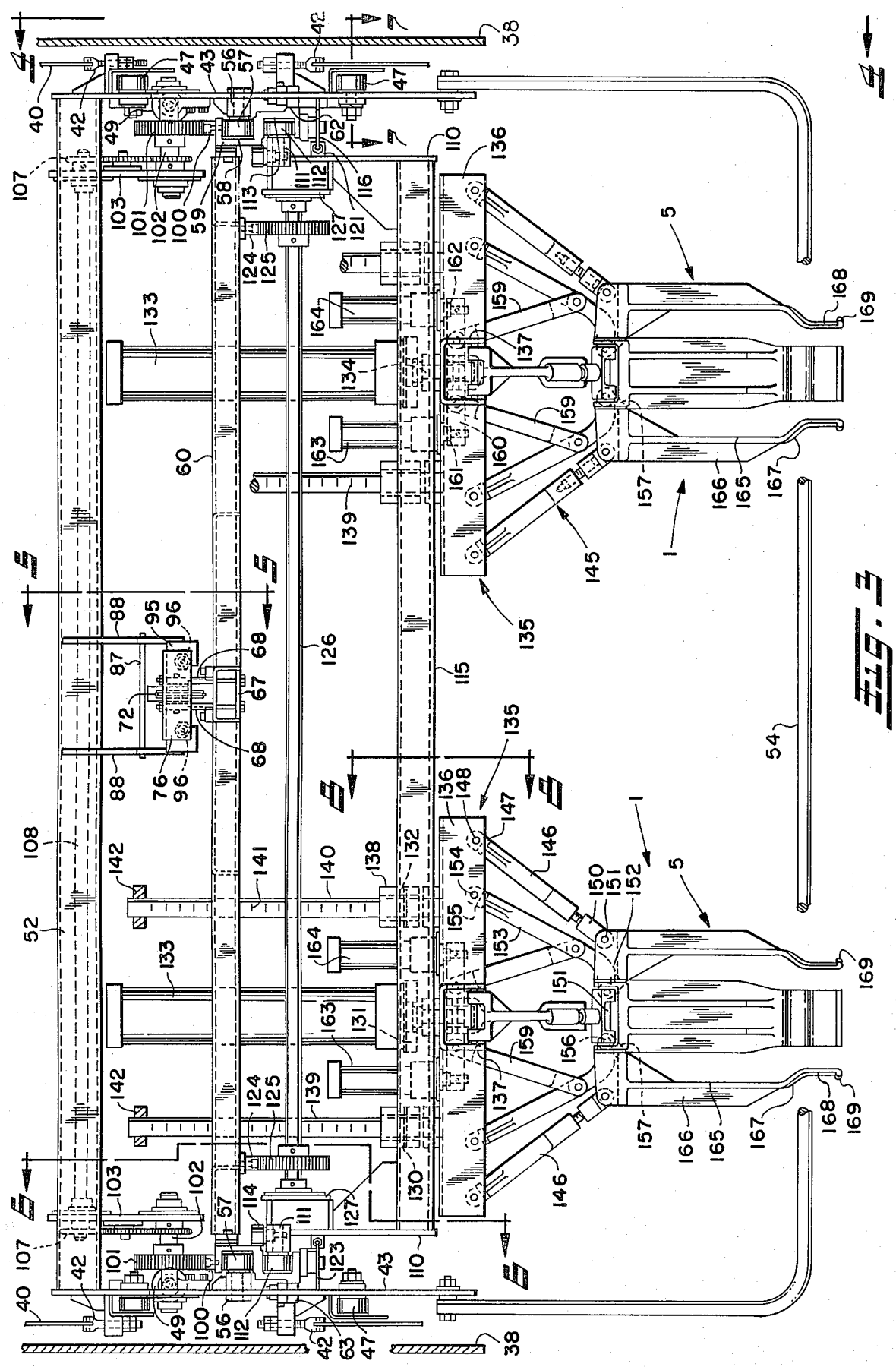

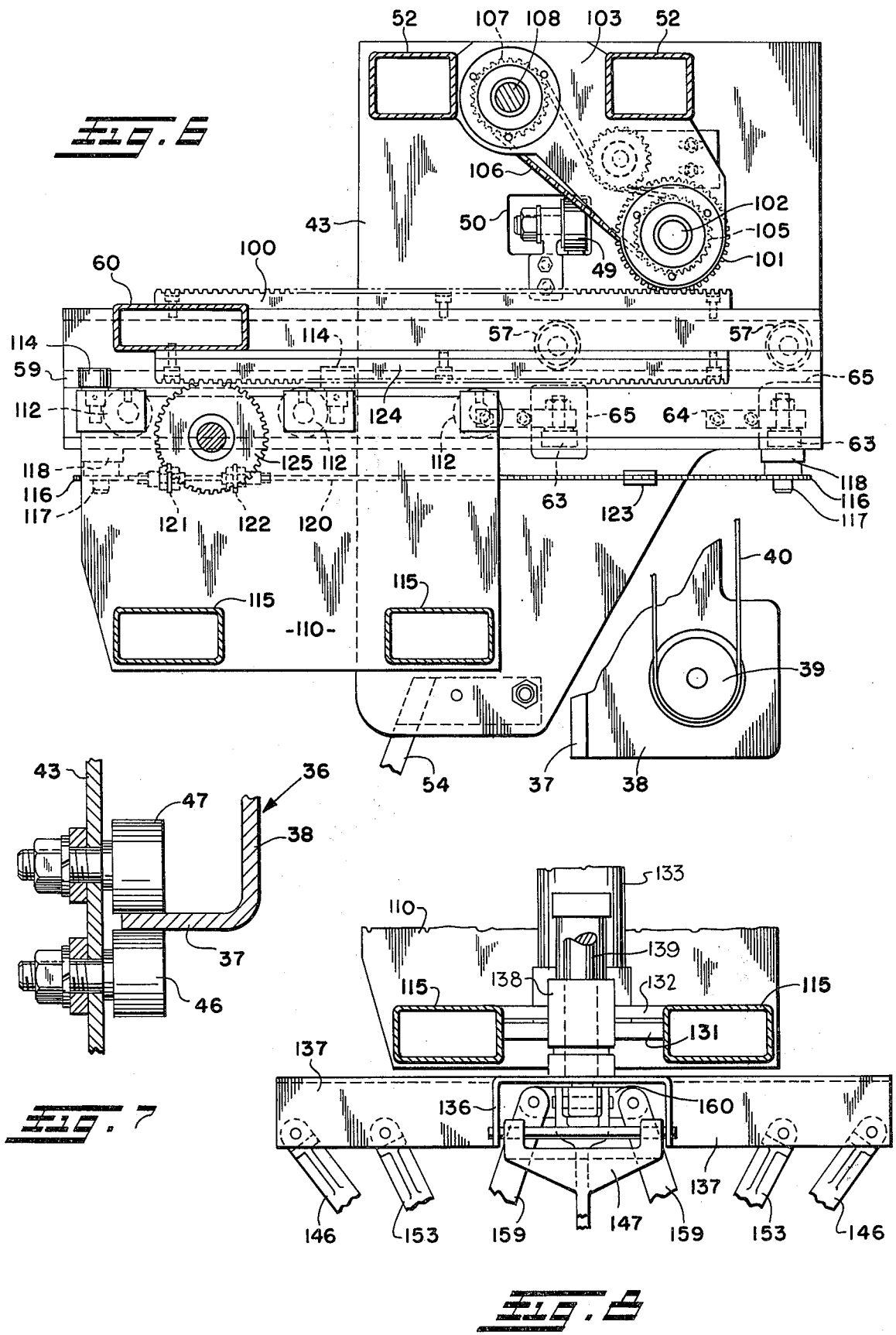

GREEN TIRE LOADER

BACKGROUND OF THE INVENTION

The present invention relates as indicated to vulcanizing presses in general and to a green tire loading device therefor in particular.

Various types of semi-automatic and automatic loading devices for tire presses have been in use for a number of years. Such loading devices have had a variety of different structural features depending upon the operational parameters involved, such as the type of press, the type of tire being loaded, the type of tire conveyor system being used, and the specific space requirements for a given installation.

For example, reference may be had to Mallory and Brundage U.S. Pat. Nos. 3,065,503 and 3,065,499, assigned to the assignee of the present invention, wherein a press and automatic loader are disclosed. Such presses feature a vertical and laterally movable press head which carries the loading mechanism on vertical tracks. The movement of the press head between closed and open positions maintains a parallelism between the mold halves so that the loading mechanism is aligned with the tire platform and lower mold half, respectively, in such positions. An elevator rides on such tracks and is independently vertically movable to pick up and positively place green tires in such closed and open positions, respectively. However, if the press head tilts, the required alignment cannot be maintained.

Such presses may be contrasted, for example, to the press with loader disclosed in Harris U.S. Pat. No. 3,222,715. In Harris, the mold halves are exclusively vertically separable, and there is no projecting bladder. The loader operates simply to swing the green tire substantially horizontally from a large table in the aisle to a position between such separated mold halves without vertical tracking. Accordingly, with an upstanding bladder, aisle clearance problems, or where vertical tracking for positive placement is required, the Harris loader is unsuitable.

On the other hand, some presses have such upstanding bladders requiring the tire to be telescoped therearound for placement on the bead ring of the lower mold half. Reference may be had to Soderquist U.S. Pat. Nos. 2,937,343 and 3,167,810 for disclosures of this type of press. Loaders for this type of press usually employ swinging jib arm type loaders requiring a substantial amount of space.

The present invention relates to a loading device for a press which may have a tilting head and a forming bladder normally extending upwardly from the lower mold half. More specifically, the present invention discloses a highly compact loader for a dual cavity vulcanizing press wherein two green tires may simultaneously be loaded onto the bead rings of the two lower mold halves about such upstanding bladders.

The prior art dual cavity loaders also have the disadvantage that the respective chuck assemblies may not necessarily be readily independently adjusted to load green tires simultaneously of uneven height, known as mismatched tires. Such condition may exist, for example, if differently sized molds are simultaneously being used in the press. With different size molds, the elevation of the toe ring of the bottom mold section may vary significantly.

It is the principal object of the present invention to provide a loading device operative to move two green tires from a pickup position in front of the press to an accurately seated position on the lower mold halves of the press.

It is another object of the present invention to provide a loading device in front of the press that is compact to permit wide aisle clearance and tilt back press head movement. The narrow compactness of the loading device is accomplished by telescopically mounting two horizontally movable carriages on a vertically movable frame to extend the carriage supporting the chucks in cantilever position fore and aft of the movable frame.

It is yet another object of the present invention to provide a loader having two side-by-side chuck assemblies that are each independently vertically adjustable whereby mismatched tires may simultaneously be loaded.

It is still another object of the present invention to provide a loader device having a chuck assembly that may be quickly and accurately vertically adjusted relative to its support serially to load differently sized tires.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a side elevation of a vulcanizing press in closed condition, the loading device of the present invention being shown holding one of the two green tires in an elevated position above the pick up point in front of the press.

FIG. 2 is a side elevation similar to FIG. 1 showing the press in open or tilt-back position and the loading device rearwardly indexed to position the green tire directly coaxially above the lower mold half.

FIG. 3 is a front elevation partially in section showing the side-by-side loading device of the present invention with the shoes of the chuck assemblies being radially collapsed and equally vertically positioned.

FIG. 6 is a fragmentary vertical section partially broken away taken along line 6—6 of FIG. 3 showing the chain interconnection of the floating and chuck carriage frames and the rack and pinion squaring mechanism.

FIG. 7 is an enlarged fragmentary horizontal section taken along line 7—7 of FIG. 4.

FIG. 8 is a fragmentary vertical section taken along line 8—8 of FIG. 3 of the support structure for the chuck assembly.

Figure 3A:
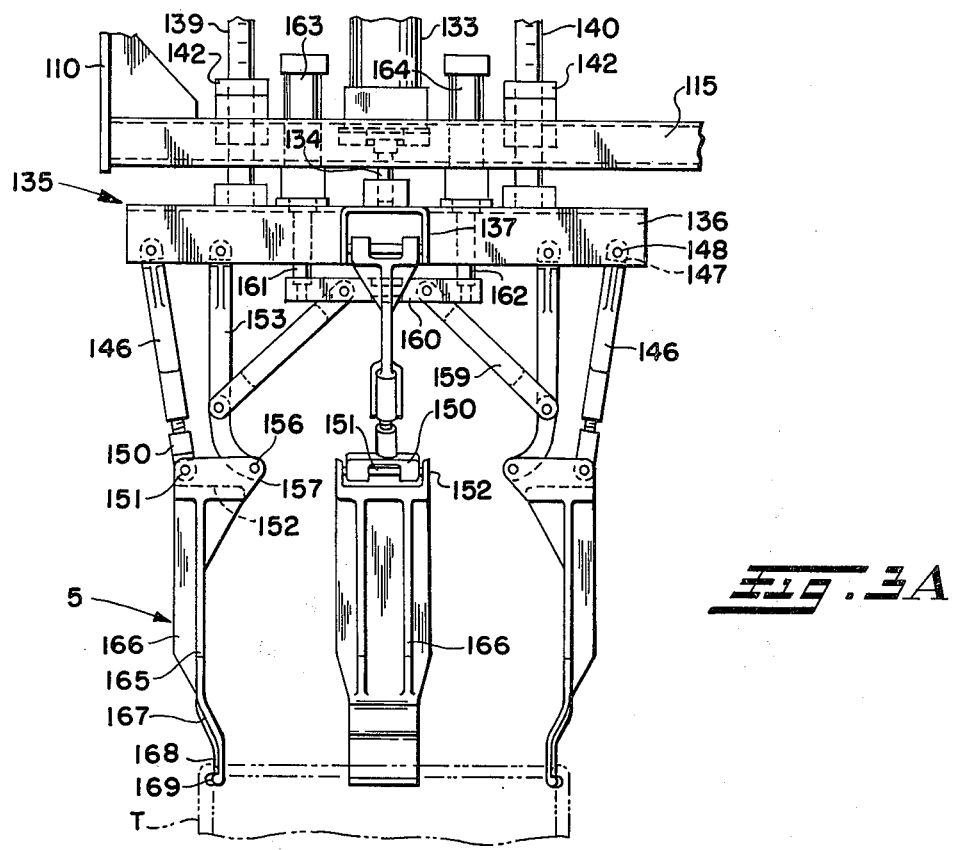
FIG. 3A is a front elevation of one chuck assembly of FIG. 3 showing the shoes radially expanded and the chuck assembly independently downwardly adjusted to engage the green tire shown in phantom.

Referring now in more detail to the drawings and initially to FIGS. 1, 2 and 3, the loading device of the present invention includes two chuck or basket assemblies 1 and a loader assembly 2 cooperatively operating to place two green tires T on the lower mold halves 3 of a vulcanizing press 4. Each chuck assembly includes a plurality of shoes 5 that are radially expandable and contractable to engage and release, respectively, the inner upper beads of a green tire T. The loader assembly is operative rectilinearly to move the green tires engaged by the chuck assembly from a pickup position P adjacent the press front to a subsequent loading position on or just above the lower mold halves 3. Such loading movement consists of three components, namely, a vertically upwardly directed initial lift, a rearwardly directed shift, and a vertical, downwardly directed movement. Such movements normally occur in sequence, although it will be appreciated that horizontal and vertical movements may occur simultaneously.

It will be appreciated that the green tires may be manually placed at the pickup position P in locations which are directly below the chuck assemblies when the same are forwardly indexed as shown in FIG. 1. Such locations may be accurately established by painting circles on the floor or by using tire stands. It will be appreciated that the present loading device may be used with either radial or bias ply tires.

The vulcanizing press 4 disclosed herein has a stationary base 6 which supports the lower mold halves and may be mounted in a pit 7 below floor level 8. As best shown in FIG. 2, each of the lower mold halves may have a centrally located upstanding post 9 carrying an inflatable rubber membrane or shaping bladder 10. With such upstanding bladder, the green tires carried by the loading device must be lowered thereover for proper placement with respect to the bead rings of lower mold halves 3.

The lower mold halves are cleared for loading by the opening of the press head 10. Such opening movement is obtained by first moving the press head vertically and then to the "tiltback" or open FIG. 2 position. Such opening movement is effected by two bull gears 12 journalled to each side of the press by stub shafts 13. A crank pin 14 is mounted on the periphery of each bull gear 12 and has secured thereto the lower end of crank link 15. The upper end of each link 15 has an inwardly extending shaft 16 connected thereto which in turn is connected to the press head 10. Each of the shafts 16 carries a sliding bushing 17 that follows a track on the side plates 18 of the press, such track being formed by a vertically extending slot 19 and a rearwardly extending top surface 20.

Press head 10 has two laterally spaced side arms 21 that carry pins 22 at their lower ends. Such pins 22 are provided with rollers 23 that are confined in vertical guide slots 24 in side plates 18 for movement therealong.

The bull gears 12 are reversibly turned between the positions shown in FIGS. 1 and 2 by the teeth thereof being in mesh with pinions 26 driven by the motor powered gear reducers 27. As the bull gears 12 begin to rotate in a clockwise direction from the FIG. 1 position, press head 10 initially moves vertically with bushings 17 traveling upwardly along slots 19 and with pivot rollers 22 moving vertically along guide slots 24. Such initial movement maintains the mold halves parallel. When bushings 17 clear the tops of slots 19, such bushings follow the rearwardly extending cam surfaces 20 upon further clockwise rotation of the bull gears. The confinement of the rollers 23 in slots 24 then causes the press head to tilt. When the bull gears have rotated to the FIG. 2 position, the press head 10 is thus in the open or tilt-back position. The press may be closed, of course, by rotating bull gears 12 in a counterclockwise direction resulting in press head 10 following a path directly opposite to that described above. The press head carries the two side-by-side upper mold halves that are spatially aligned with the lower mold halves so as to form the mold cavities when the press is closed. Although a pivotal tilt-back press is illustrated and described herein, it will be understood that the loading device of the present invention may be used on any type of vulcanizing press providing sufficient vertical clearance for loading.

LOADER ASSEMBLY

The loader assembly 2 includes the vertically oriented elevator track assembly 30, a vertically movable but horizontally fixed elevator frame 32, a first horizontally movable floating carriage 33 carried by the frame 32, and a second horizontally movable chuck carriage 34 telescopically carried by the floating carriage and supporting the chuck assemblies.

The elevator track assembly 30 includes two vertically extending laterally spaced guide brackets 36 attached adjacent their bottom ends to upstanding side plates 18 of the press. Such brackets are of L-shape sectional configuration to form opposed inwardly directed rails 37 and side plates 38. (See, for example, FIG. 7) As best shown in FIG. 1, such side plates each have two vertically spaced sprockets 39 journalled therein about which elevator chains 40 are entrained. The top sprockets 39 are synchronously driven by a reversible motor 41 thereby simultaneously to drive the two elevator chains.

As shown in FIG. 3, the two ends of each elevator chain 40 are connected to vertically spaced fasteners 42 carried by and extending outwardly from the transversely spaced side plates 43 of the elevator frame 32. Thus movement of elevator chains 40 by reversing loader motor 41 results in elevating or lowering frame 32. The extent of vertical travel of frame 32 is controlled by top and bottom limit switches, not shown, on brackets 36.

Figure 4:
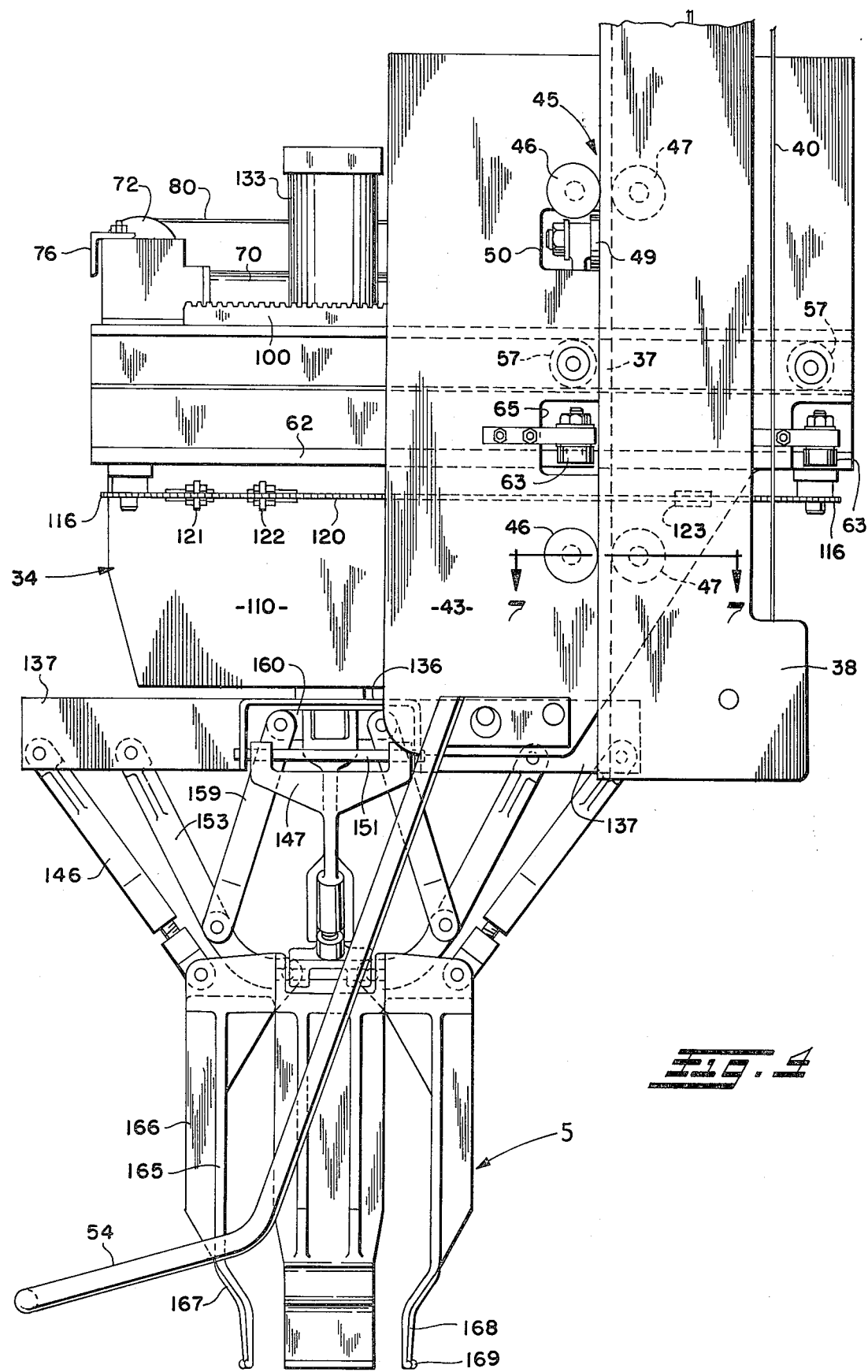
FIG. 4 is an enlarged end elevation of the loading device taken from line 4—4 of FIG. 3, with certain parts removed for clarity of illustration.

Such elevator frame is accurately guided along rails 37 by two vertically spaced pairs 45 of opposed rollers 46, 47 which are connected to and extend outwardly from each of the side plates 43. As best shown in FIG. 4, rollers 46 and 47 of each pair are horizontally spaced to straddle rails 37. The elevator frame 32 is stabilized between rails 37 by two transversely oriented rollers 49, one of which is carried by each side plate 43. Each roller 49 extends through an aperture 50 provided in such side plate and engages the inside edge or surface of rail 37.

Figure 5:
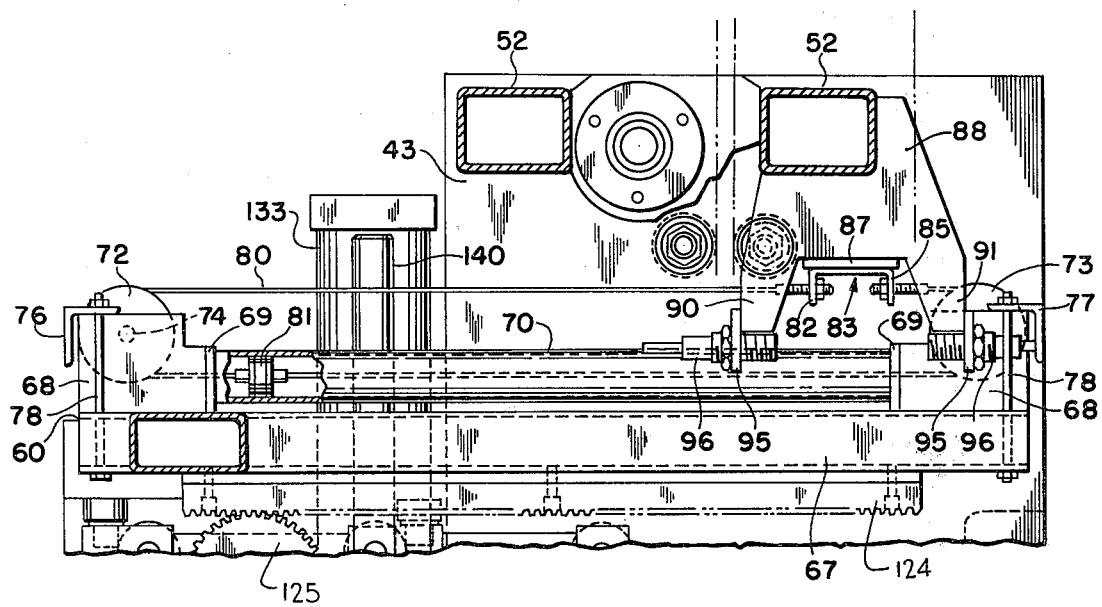
FIG. 5 is a fragmentary vertical section taken along line 5—5 of FIG. 3 showing the cable cylinder for driving the loader horizontally, with the cylinder being broken away for clarity of illustration.

As seen in FIGS. 3, 5 and 6, the elevator frame 32 includes two elongated horizontally spaced beams 52 interconnecting side plates 43. A downwardly depending forwardly extending U-shape safety bar 54 is pivotally connected to the bottoms of the side plates 43. Such safety bar 54 upon engagement with any object in the path of the loader travel pivots to trip switches (not shown) to stop the downward travel of the loader.

As best shown in FIGS. 3 and 6, each of the side plates 43 of elevator frame 32 is provided with two horizontally spaced inwardly extending supports 56 in which the shafts of rollers 57 are mounted. Rollers 57 are received in the outwardly facing upper channels 58 of S-shaped, in end elevation, side plates 59 of the first or floating carriage 33. Such S-shape side plates are interconnected adjacent their tops by horizontal frame 60. Such side plates 59 at the lower outer edges thereof have projecting rail surfaces 62, each engaged by two horizontally spaced vertical axis rollers 63 which are mounted on side plates 43 of elevator frame 32 by suitable brackets 64 (FIG. 6). Such rollers extend through two horizontally spaced apertures 65 in plates 43. The opposed lateral engagement of S-shape side plates 59 by rollers 63 acts transversely to stabilize the floating carriage in its fore and aft movement.

The frame 60 of the floating carriage has a linear front edge and a rear edge having a profile from the top in the general shape of a W, the center of which is designated at 67. Two laterally spaced upstanding L-shape head plates 68 are connected to the top surface of center portion 67 at the fore and aft ends of the same, with the inner ends of such plates being interconnected by cylinder heads 69. A longitudinally extending cable cylinder assembly 70 extends between such heads. Cable sheaves 72, 73 are rotatably carried by shafts 74 extending between such laterally-spaced head plates 68. The cable cylinder is secured to the top of center portion 67 by two angles 76 and 77 secured by elongated fasteners 78 as best seen in FIGS. 3 and 5.

A cable 80 is secured to piston 81 of the cable cylinder assembly 70 and extends around sheave 72 to a fixed connection to one leg 82 of short inverted channel 83. The other end of such cable extends around sheave 73 back to a connection with the other leg 85 of channel 83.

Channel 83 is connected to plate 87 which interconnects the crotch of two vertically oriented laterally spaced brackets 88, each having fore and aft downwardly extending legs 90 and 91, respectively. The top of each bracket has a rectangular cutout that nests with the aft beam 52 of the frame 32. Each leg of each bracket 88 has secured thereto a plate 95 for mounting hydraulic shock absorbers 96. As can be seen from FIGS. 3 and 5, there are two forwardly extending and two rearwardly extending shock absorbers that are in the fore and aft path of the vertical legs of laterally projecting angles 76 and 77, respectively.

Thus it will be appreciated that when pneumatic pressure is applied to the left face of the piston 81 as viewed in FIG. 5, the movement of the same along the cylinder will draw the first or floating carriage rearwardly relative to frame 32 due to the connection of cable 80 to such frame at leg 82. The stroke of piston 81 will equal the total fore or aft movement of the floating carriage 33. At the end of the piston stroke to the right, for example, as viewed in FIG. 5, the vertical face of angle 76 will engage the plungers of the two forwardly facing shock absorbers to terminate such movement. At the end of the forwardly directed movement of floating carriage 33, caused by pressure on the right face of piston 81, the vertical face of angle 77 will engage the plungers of the rearwardly facing shock absorbers as seen in FIG. 5.

The control circuit for the pneumatic system of cable cylinder assembly 70 includes limit switches (not shown) which may be tripped by plates 95. Thus when two of such shock absorbers are engaged, as above described, the pressurized side of the piston 81 is automatically vented. The shock absorbers are longitudinally adjustable relative to mounting plates 95 and thus the stroke of piston 81 may be adjusted for precise loader chuck centering.

To prohibit any cocking of the floating carriage during its fore and aft movement, a synchronization assembly is provided between carriage 33 and frame 32 to insure equal rectilinear fore and aft movement at each end of the same. Referring to FIGS. 3 and 6, transversely spaced racks 100 are connected to the top surfaces of each of the S-shape side plates 59 of the floating carriage 33. Pinions 101 are in mesh with the racks 100, such pinions being keyed to stub shafts 102. Such shafts 102 are journalled between loader frame side plates 43 and vertical plates 103 that are secured at their tops to both beams 52 of frame 32 as best shown in FIG. 6. Each of the shafts 102 is provided with a sprocket 105 that drives an endless chain 106 which extends also about sprockets 107 keyed to the projecting ends of elongated synchronizing shaft 108 journalled in and extending between support plates 103. The racks, pinions, and interconnected shafting provide a squaring mechanism for the floating frame.

As seen in FIGS. 3 and 6, the chuck carriage 34, which is supported from the floating carriage, includes end plates 110 each of which carries adjacent its top three equally spaced outwardly extending roller brackets 111 supporting horizontally extending and aligned rollers 112, such rollers being received in the lower inwardly facing channels 113 of S-shape side plates 59 of the floating frame. The loader carriage is transversely stabilized in its fore and aft movement by horizontally spaced, vertical axis rollers 114 carried on the top of each side plate 110, such rollers engaging the upper, inside surfaces of opposed S-shape side plates 59 of the floating carriage 33. The vertically oriented substantially rectangular sides 110 are interconnected adjacent their bottoms by two horizontal beams 115.

The chuck carriage 34 is interconnected to the floating carriage 33 so that such carriages will move in the same fore and aft direction upon actuation of cable cylinder 70. Such interconnection is effected by a chain and sprocket assembly that requires the carriages to move in the same direction but requires the chuck carriage to move twice as fast and thus twice as far as the floating carriage, telescoping fore and/or aft therefrom.

This two-to-one advantage is obtained by two vertical axis sprockets 116 journalled on shafts 117 mounted in sockets 118 which depend from the bottom ends of each S-shape side plate 59. A chain 120 extends about the horizontally spaced sprockets 116 and has its ends fixedly secured to outwardly extending anchors 121 and 122 on side plates 110 of the loader carriage frame. The center of each chain is anchored at 123 to a bracket extending from the interior of plates 43 of the loader frame. Accordingly, as the sprocket 116 seen on the right-hand side of FIG. 6 moves to the right, the chain anchor 122 will move to the right also, but twice as fast. Instead of chains and sprockets, it will be appreciated that clamped cables and sheaves may provide the two-to-one reeving system.

The telescopic fore and aft movement of the chuck carriage is squared relative to the floating carriage by synchronously driven rack and pinion interconnections between the two. More specifically, parallel racks 124 are secured to the bottom of each rearwardly projecting end of frame 60 of floating carriage 33. Pinions 125 are in mesh with racks 124, such pinions being keyed to a common elongated shaft 126 which is journalled in plates 127 spaced inwardly from and mounted on side plates 110 of the chuck carriage.

This telescopic movement between the two carriages permits the loader assembly to be structurally compact while allowing the necessary vertical clearance for press opening and closing. As illustrated, a two-to-one mechanical advantage is obtained resulting in the chuck carriage traveling twice as far as the floating carriage and telescoping in cantilever fashion fore and aft of the floating carriage. Actually, the front or rear roller 112 may project from the channel of the S-shape side plates in cantilever fashion but the chuck carriage will always be supported by at least two of the three rollers 112.

CHUCK ASSEMBLIES

The two side-by-side chuck assemblies 1 are carried by the two beams 115 of the chuck carriage. As best shown in FIGS. 3 and 8, three fore and aft struts 130, 131, and 132 extend between the two cross beams 115 for each chuck assembly. The central strut 131 for each assembly supports a vertically extending master piston-cylinder assembly 133, the piston rod 134 of which extends downwardly through strut 131 and carries at its free end the cross-shape supporting structure 135 for shoes 5. Each of such cross-shape supporting structures includes a transversely extending downwardly turned channel 136 and two intermediate downwardly turned channels 137 which are welded to cutouts in opposed legs of channel 136 to extend perpendicularly fore and aft therefrom.

Two transversely spaced vertically oriented posts 139 and 140 are connected at their bottom ends to the top surface of transverse channel 136. Posts 139 and 140 extend upwardly through bushings in collars 138 supported by struts 130 and 132, respectively, and are each provided with identical graduated scales 141 indicating the height of the shoes 5 relative to the floor 8 or other pickup position reference level. The posts 139 and 140 each have vertically adjustable collars 142 thereon (FIG. 3) that are similarly vertically positioned, such collars being operative to establish the maximum downward travel of the cross-shape supporting member 135 relative to the loader frame by engaging collars 138. It will be appreciated from the above description that the cross-shape supporting structures 135 for the two chuck assemblies are each independently vertically adjustable relative to the loader carriage by the two piston-cylinder assemblies 133. (Compare FIGS. 3 and 3A). This independent vertical adjustability permits two green tires of different heights to be simultaneously transported by the two chuck assemblies of the loader since the elevation of the chuck shoes for each assembly may be independently correlated to the upper bead height of the tire to be loaded. In addition, such adjustability permits the loading device to be quickly and accurately adjusted to load differently sized tires without adjusting the positions of limit switches.

Referring now to the chuck assemblies, there are four identically formed shoes 5 for each such assembly, with each shoe being supported by a parallel linkage indicated generally at 145. The four linkages 145 are respectively pivotally connected at their tops to the four distal ends of the channels forming the cross-shape supporting member 135.

Referring to FIG. 3, each parallel linkage 145 includes an outer adjustable length link 146 having an upper clevice 147 pivotally connected by pin 148 to channel 136 or 137 and a lower clevice 150 pivotally connected by pin 151 to an upwardly turned channel 152 on the shoes 5. The inner link 153 of each linkage 145 is similarly pivotally connected at the top by a pin 154 and clevice 155 to channel 136 or 137 and is connected at its bottom end to the shoe 5 by a pin 156 extending between more narrowly spaced attachment ears 157.

A link 159 is pivotally connected to each link 153 adjacent its bottom and extends upwardly and inwardly to a pivotal connection with spider 160. Such spider is vertically reciprocally movable by being dependently supported by piston rods 161 and 162 of piston-cylinder assemblies 163 and 164, respectively. Such piston-cylinder assemblies are mounted on the top web of channel 136 and extend upwardly between beams 115 of the chuck carriage. When the piston rods of the piston-cylinder assemblies are retracted, spider 160 is received within the confines of the channels 136 and 137 as best shown in FIG. 4, and shoes 5 are radially collapsed. When the piston rods are advanced, spider 160 moves downwardly thereby radially to move the parallel linkages about their upper pivot points. Such movement of linkages 145 results in the shoes 5 radially expanding, with such shoes remaining substantially vertical during such expansion. Each shoe 5 is formed with an upper channel 152, a substantially straight upper section 165 reinforced by two exterior ribs 166, a radially inwardly bent portion 167, a vertical engagement section 168, and a lower outwardly protruding lip 169.

Thus as shown in FIG. 3A, radial expansion of shoes 5 by downwardly advancing spider 160, results in the four exterior surfaces of the engagement sections 168 contacting the inner upper bead of the green tire at four circumferentially spaced locations. The radially outwardly directed pressure generated by the two piston-cylinder assemblies 163 and 164 is normally sufficient to hold the green tire by the upper bead at some position intermediate the ends of sections 168. However, if the green tire should slip slightly downwardly while in an elevated position during loading, the lower lips 169 on the shoes 5 act to retain the green tire on the chuck assembly.

OPERATION OF THE LOADER

Although the operation of the loader of the present invention is believed apparent from the above description, a complete cycle of the tilt-back vulcanizing press will be described below for clarity of understanding. The description of the cycle begins with two tires undergoing vulcanization in the closed press, two green tires being accurately located at the pickup position P and an empty loading device being in the elevated FIG. 1 position.

Upon manual actuation of the loader control system, loader motor 41 will be energized to drive chain 40 in a counterclockwise direction as viewed in FIG. 1. Accordingly, the elevated loading device connected to such chain will descend to its bottom position and engage lower tire actuated limit switches to deenergize motor 41. If the safety bar 54 of the descending loader contacts any foreign object or person in its path, a safety switch will be actuated to stop the loader descent and reverse its direction of travel. If no tires are present at the pickup position P, the bottom limit switches and overtravel switches (not shown) are actuated automatically to reverse the loading device to return the same to its elevated position as shown in FIG. 1.

When green tires T are present at the pickup position P, the control system of the loading device automatically actuates piston-cylinder assemblies 163 and 164 downwardly to move spider 160 for radial expansion of the shoes 5. Such radial expansion results in the engagement sections 168 of shoes 5 contacting the inner upper beads of the green tires. If mismatched green tires are present at the pickup location, one or both of the chuck assemblies 1 may be independently vertically adjusted by piston-cylinder assembly 133 to bring the shoes into proper vertical position relative to the inner upper bead of the green tire to be loaded. Once the green tires are positively engaged by the radially expanded chuck assemblies, the loading device is indexed upwardly by reversal of the loading motor 41. The two green tires T carried by the expanded chuck assemblies 1 remain in the FIG. 1 position during completion of the cure, and the operator may then place additional green tires T at the pickup location P.

Upon completion of the cure cycle, internal pressure is released from the cured tires and the press opens to the FIG. 2 position. The unloader 175 moves in to pick up the cured tires and subsequently discharges them on conveyor 176 to a post cure inflator (not shown).

After cured tire removal and with the press still open, the cable cylinder 70 on the floating carriage is automatically actuated rearwardly to move the two carriages. The rearwardly directed movement of the floating carriage 33 relative to the fixed frame 32 results in the chuck carriage 34 telescopically moving rearwardly twice as far due to the interconnection between such carriages. At the end of the rearwardly directed movement of the carriages as accurately controlled by limit switches, the two elevated green tires T are positioned above and coaxial with the lower mold halves 3 of the vulcanizing press. The loader motor 41 is then automatically energized by the control system to drive the loading device downwardly until the green tires are positioned on or slightly above the bead rings of the lower mold halves. The bladder 10 is then expanded into the tire by internal pressure, and when the green tires are properly controlled by such bladder, the chuck shoes are automatically radially collapsed by driving spider 160 vertically upwardly. The collapsed loading device is then elevated and, at the top of its travel, the cable cylinder 70 is reversely actuated forwardly to move the chuck assemblies to the idle FIG. 1 position. The loading device may then be subsequently manually or automatically actuated to descend for green tire pickup.

After the loading device has resumed its FIG. 1 position, the bull gears 12 are moved in a counterclockwise direction as viewed in FIG. 1 to close the press for shaping and vulcanizing the tires.

I, therefore, particularly point out and distinctly claim as my invention:

1. A loader for a tire press comprising two upstanding parallel tracks, an elevator frame mounted on and extending between said tracks for vertical movement therealong, said elevator frame including side plates guided by said tracks with a horizontal frame member extending therebetween, a chuck frame supporting at least one tire chuck, means supporting said chuck frame on said elevator frame for horizontal movement, and drive means interconnecting said elevator frame and chuck frame to move the chuck frame horizontally relative to said elevator frame.

2. A loader as set forth in claim 1 including a floating frame between said elevator frame and chuck frame, and means interconnecting said frames to cause the chuck frame to move further than said floating frame.

3. A loader as set forth in claim 2 wherein said drive means includes a piston-cylinder assembly interconnecting said floating frame and elevator frame to move both the floating frame and chuck frame horizontally.

4. A loader as set forth in claim 3 including a two-to-one reeving system interconnecting said elevator, floating and chuck frames to move the latter twice as far horizontally as said floating frame.

5. A loader as set forth in claim 3 wherein said piston-cylinder assembly is a cable cylinder assembly.

6. A loader as set forth in claim 5 wherein the cylinder of said assembly is mounted on said floating frame and the ends of the cable are anchored to said elevator frame.

7. A loader as set forth in claim 3 wherein said piston-cylinder assembly is located in the middle of said floating frame, and squaring means interconnecting said elevator, floating and chuck frames.

8. A loader as set forth in claim 3 including squaring means interconnecting said elevator, floating and chuck frames.

9. A loader as set forth in claim 8 wherein said squaring means comprises racks on said floating frame at each end thereof, and shaft connected pinions in mesh therewith on said elevator and chuck frames, respectively.

10. A loader as set forth in claim 3 wherein said floating frame includes opposite hand S-shape end plates forming outwardly and inwardly directed horizontal roller channels, rollers on said elevator frame confined in said outwardly directed channels, and rollers on said chuck frame confined in said inwardly directed channels.

11. A loader as set forth in claim 1 including side-by-side tire chucks on said chuck frame, and means independently vertically to adjust said tire chucks.

12. A loader as set forth in claim 11 wherein said last mentioned means comprises a vertically extending piston-cylinder assembly for each chuck, and adjustable stop means to limit the stroke thereof.

13. A tire loader comprising two parallel vertically extending tracks, a loader frame extending between said tracks for vertical movement therealong, a floating frame supported by said loader frame for movement transversely of said tracks, and a chuck frame supported by said floating frame for movement therewith and for movement with respect thereto to extend in cantilever fashion from said floating frame.

14. A loader as set forth in claim 13 including a cable cylinder assembly driving said floating and chuck frame for such movement.

15. A loader as set forth in claim 13 including a two-to-one reeving system interconnecting said loader frame, floating frame and chuck frame for such respective movement between said floating and chuck frame.

16. A loader as set forth in claim 13 including squaring means interconnecting said elevator, floating and chuck frames.

17. A loader as set forth in claim 13 wherein said floating frame includes opposite hand S-shape end plates forming outwardly and inwardly directed horizontal roller channels, rollers on said elevator frame confined in said outwardly directed channels, and rollers on said chuck frame confined in said inwardly directed channels.

18. A loader as set forth in claim 14 wherein the cylinder of said assembly is mounted on said floating frame and the ends of the cable are anchored to said elevator frame.

19. A tire loader adapted to be mounted on the front of a tire curing press comprising a vertically movable elevator frame, a horizontally movable floating frame mounted on said elevator frame, a tire chuck frame mounted on said floating frame, drive means horizontally to move said floating frame, and means interconnecting said elevator, floating, and chuck frame to cause the latter to extend in cantilever fashion fore and aft of said elevator frame.

20. A loader as set forth in claim 19 including a cable cylinder assembly driving said floating and chuck frame for such movement.

21. A loader as set forth in claim 19 including a two-to-one reeving system interconnecting said loader frame, floating frame and chuck frame for such respective movement between said floating and chuck frame.

22. A loader as set forth in claim 19 including squaring means interconnecting said elevator, floating and chuck frames.

23. A loader as set forth in claim 19 wherein said floating frame includes opposite hand S-shape end plates forming outwardly and inwardly directed horizontal roller channels, rollers on said elevator frame confined in said outwardly directed channels, and rollers on said chuck frame confined in said inwardly directed channels.

24. A loader as set forth in claim 20 wherein the cylinder of said assembly is mounted on said floating frame and the ends of the cable are anchored to said elevator frame.

25. A side-by-side loading device simultaneously to transport two green tires from a pickup position to a loading position with respect to side-by-side lower mold halves of a vulcanizing press comprising two chuck assemblies operative to engage and release said tires, carrying means to transport said chuck assemblies between said positions, and means independently vertically to move either of said chuck assemblies relative to said carrying means, whereby mismatched tires may simultaneously be loaded, each of said chuck assemblies including a support frame which is vertically adjustable with respect to said carrying means, a piston-cylinder assembly means mounted on said carrying means for each chuck, the free end of the piston rod of the respective piston-cylinder assembly means carrying the respective support frame, and each support frame including at least one upwardly extending post extending through a portion of said carrying means and having a vertically adjustable stop collar thereon, the vertical position of such stop collar establishing the elevation of said support frame by engaging said portion of said carrying means and acting as an adjustable stop for the respective piston-cylinder assembly means.

26. A loader as set forth in claim 1 wherein said means supporting said chuck frame on said loader frame for horizontal movement comprises horizontal rails and rollers.

27. A loader as set forth in claim 1 wherein said drive means comprises a horizontally extending piston-cylinder assembly.

28. A loader as set forth in claim 1 wherein said drive means is mounted on the horizontal frame member of said elevator frame.

29. A loader as set forth in claim 1 including squaring means interconnecting said elevator frame and said chuck frame at each end thereof to maintain said chuck frame parallel to said horizontal frame member of said loader frame during horizontal movement of said chuck frame.

* * * * *